(12) United States Patent
Omori

(10) Patent No.: US 9,915,286 B2
(45) Date of Patent: Mar. 13, 2018

(54) RADIAL FOIL BEARING

(71) Applicant: IHI Corporation, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 50 days.

(21) Appl. No.: 15/233,015

(22) Filed: Aug. 10, 2016

(65) Prior Publication Data

US 2016/0348714 A1    Dec. 1, 2016

Related U.S. Application Data

(63) Continuation of application No. PCT/JP2015/054444, filed on Feb. 18, 2015.

(30) Foreign Application Priority Data

Feb. 18, 2014    (JP) .................... 2014-028389

(51) Int. Cl.
F16C 32/06 (2006.01)
F16C 17/02 (2006.01)
F16C 43/02 (2006.01)

(52) U.S. Cl.
CPC ............ *F16C 17/024* (2013.01); *F16C 43/02* (2013.01)

(58) Field of Classification Search
CPC ................. F16C 17/042; F16C 43/02
See application file for complete search history.

(56) References Cited

U.S. PATENT DOCUMENTS

| 2008/0310778 A1 | 12/2008 | Lee et al. |
| 2014/0169708 A1 | 6/2014 | Omori |
| 2015/0233415 A1* | 8/2015 | Larsen .................. F16C 17/024 384/103 |
| 2016/0010682 A1 | 1/2016 | Omori |

FOREIGN PATENT DOCUMENTS

| CN | 101044332 A | 9/2007 | |
| JP | 58160619 A * | 9/1983 | |
| JP | 59197614 A * | 11/1984 | |
| JP | 60136615 A * | 7/1985 | |
| JP | H01-038334 Y2 | 11/1989 | |
| JP | 2002-005159 A | 1/2002 | |
| JP | 2003120213 A * | 4/2003 | ............ F16C 17/024 |
| JP | 2004-011839 A | 1/2004 | |
| JP | 2013-032799 A | 2/2013 | |
| JP | 2013-100885 A | 5/2013 | |
| JP | 2013-217425 A | 10/2013 | |
| JP | 2014-020463 A | 2/2014 | |
| JP | 2014-178038 A | 9/2014 | |
| RU | 2010119 C1 | 3/1994 | |

* cited by examiner

*Primary Examiner* — Phillip A Johnson

(57) ABSTRACT

A radial foil bearing includes: a cylindrical top foil disposed so as to face a rotary shaft; a back foil disposed outside in the radial direction of the top foil; and a cylindrical bearing housing accommodating the top foil and the back foil. The bearing housing is provided with a limiting member which limits movement of the back foil. A locking recess is provided in a central part in the axial direction of an inner circumferential surface of the bearing housing. In addition, the limiting member includes a locking protrusion and is fixed to the bearing housing by the locking protrusion being locked into the locking recess.

20 Claims, 6 Drawing Sheets

RADIAL FOIL BEARING

This application is a Continuation application based on International Application No. PCT/JP2015/054444, filed Feb. 18, 2015, which claims priority on Japanese Patent Application No. 2014-28389, filed Feb. 18, 2014, the contents of which are incorporated herein by reference.

TECHNICAL FIELD

The present disclosure relates to a radial foil bearing.

BACKGROUND

In the related art, as a bearing used for a high-speed rotating body, a radial bearing is known which is used in a state of encircling a rotary shaft. As such a radial bearing, a radial foil bearing is well known which includes a thin sheet-shaped top foil forming a bearing surface, a back foil resiliently supporting the top foil, and a cylindrical bearing housing accommodating the top foil and the back foil. A bump foil, in which a thin sheet is formed in a wave sheet shape, is mainly employed as the back foil of the radial foil bearing.

As such a radial foil bearing, Patent Document 1, particularly FIG. 4 thereof, or FIG. 2 of Patent Document 2 discloses a structure including a bar-shaped locking member (a limiting member) which limits the movement of the back foil in the axial direction in order to prevent detachment of the back foil from the bearing housing.

In the structure of Patent Document 1 or 2, in order to fix the locking member to the bearing housing, two side surfaces (end surfaces in the axial direction) of the bearing housing are provided with engagement portions (engagement recesses, engagement grooves), and the engagement portions are engaged with engagement portions (engagement arms, engagement legs) of the locking member. The locking member holds the back foil, whereby the movement of the back foil in the axial direction is limited, and the detachment of the back foil from the bearing housing is prevented.

Patent Documents 3 to 5 disclose a radial foil bearing which includes a top foil (an upper foil) and a back foil (a back spring, an under foil).

DOCUMENT OF RELATED ART

Patent Document

[Patent Document 1] Japanese Unexamined Patent Application, First Publication No. 2013-100885
[Patent Document 2] Japanese Unexamined Patent Application, First Publication No. 2013-032799
[Patent Document 3] Japanese Unexamined Patent Application, First Publication No. 2013-217425
[Patent Document 4] Japanese Unexamined Patent Application, First Publication No. 2004-11839
[Patent Document 5] Japanese Unexamined Patent Application, First Publication No. 2002-5159

SUMMARY

Technical Problem

In the engagement recesses or grooves provided in two side surfaces of the bearing housing, it is difficult to form the width of the engagement recess or groove to be narrow to the same extent as the locking member due to restrictions on machining, and the width thereof may be formed to be significantly greater than the width (the thickness) of the locking member. If the engagement recesses or grooves whose width is greater than that of the locking member are provided in two side surfaces of the bearing housing, a part of the back foil positioned above the engagement recess or groove (on the inner circumferential surface-side of the bearing housing) is not supported by any members from under at a position above the engagement recess or groove, and therefore it is also difficult to sufficiently support a part of the top foil placed on the part of the back foil from under at the position above the engagement recess or groove. Thus, during operation of the radial foil bearing, a partial flexure may occur in the top foil at the position above the engagement recess or groove. Such a partial flexure does not only cause the top foil to be recessed but may also cause the top foil to have a protrusion toward the rotary shaft positioned on the opposite side of the top foil from the bearing housing.

However, if the protrusion is formed in this way, the protrusion rubs against the rotary shaft, whereby the top foil is partially worn, and the durability of the bearing may deteriorate. In addition, since a recess or protrusion is caused to the top foil, the top foil has a distortion, the load capability or the dynamic characteristics (the rigidity and the damping performance) of the bearing are affected, and therefore it may be difficult to obtain the design performance of the bearing.

In order to prevent deterioration of the durability due to such a partial flexure of the top foil, it is conceivable that the length of the top foil in the axial direction be set to be less than that of the bearing housing, and the top foil not be positioned above the engagement recess or groove. However, in this case, since the length of the top foil is decreased, the load capability or the dynamic characteristics (the rigidity and the damping performance) of the bearing are also affected, and thus it is difficult to obtain the design performance thereof.

Furthermore, in a case where a side surface of the bearing housing is attached to a casing or the like in close contact therewith and this attachment position has to be maintained airtight, if the engagement recesses or grooves are provided in two side surfaces (two end surfaces) of the bearing, it is difficult to configure a sealing structure using an O-ring or the like at the side surface.

The present disclosure has been made in view of the above circumstances, and an object thereof is to provide a radial foil bearing which can prevent deterioration of the durability or deterioration of performance such as the load capability of the bearing due to a partial flexure of a top foil and can easily configure a sealing structure at a side surface of the bearing.

Solution to Problem

A first aspect of the present disclosure is a radial foil bearing for supporting a rotary shaft in a state of encircling the rotary shaft, the radial foil bearing including: a cylindrical top foil disposed so as to face the rotary shaft; a back foil disposed outside in a radial direction of the top foil; and a cylindrical bearing housing accommodating the top foil and the back foil. The bearing housing is provided with a limiting member which limits movement of the back foil at least in an axial direction of the bearing housing. A locking recess is provided in a central part in the axial direction of an inner circumferential surface of the bearing housing. In addition, the limiting member includes a locking protrusion and is fixed to the bearing housing by the locking protrusion being locked into the locking recess of the bearing housing.

A second aspect of the present disclosure is that in the radial foil bearing of the first aspect, the inner circumferential surface of the bearing housing is provided with a holding groove which is formed in the axial direction and communicates with the locking recess. The limiting member includes a bar-shaped portion and an engagement protrusion provided in the bar-shaped portion. A central part in a length direction of the bar-shaped portion is provided with the locking protrusion, and the bar-shaped portion is accommodated in and fixed to the holding groove in a state where the locking protrusion is locked into the locking recess. The engagement protrusion protrudes upward of the holding groove. In addition, the back foil is provided with an engagement notch which engages with the engagement protrusion.

A third aspect of the present disclosure is that in the radial foil bearing of the second aspect, the engagement protrusion is provided in each of two end parts in the length direction of the bar-shaped portion, and the engagement notch is provided in each of two edge parts in the axial direction of the back foil.

A fourth aspect of the present disclosure is that in the radial foil bearing of the second or third aspect, the back foil is formed in a wave sheet shape in which valley parts contacting the bearing housing and peak parts bulging toward the top foil are alternately arranged in a circumferential direction of the bearing housing. In addition, the engagement notch of the back foil is provided in a valley part.

A fifth aspect of the present disclosure is that in the radial foil bearing of the first aspect, the inner circumferential surface of the bearing housing is provided with a holding groove which is formed in the axial direction and communicates with the locking recess. The back foil is provided with a locking hole and an engagement notch. The limiting member includes a bar-shaped portion and an engagement protrusion which is provided in the bar-shaped portion and engages with the engagement notch of the back foil. In addition, a central part in a length direction of the bar-shaped portion is provided with the locking protrusion, and the bar-shaped portion is disposed above the holding groove in a state where the back foil is positioned between the bar-shaped portion and the bearing housing and the locking protrusion is locked into the locking recess through the locking hole.

A sixth aspect of the present disclosure is that in the radial foil bearing of the fifth aspect, the engagement protrusion is provided in each of two end parts in the length direction of the bar-shaped portion, and the engagement notch is provided in each of two edge parts in the axial direction of the back foil.

A seventh aspect of the present disclosure is that in the radial foil bearing of the sixth aspect, the engagement protrusion engages with the engagement notch of the back foil and is inserted into the holding groove.

An eighth aspect of the present disclosure is that in the radial foil bearing of the sixth or seventh aspect, the back foil is formed in a wave sheet shape in which valley parts contacting the bearing housing and peak parts bulging toward the top foil are alternately arranged in a circumferential direction of the bearing housing. The engagement notch of the back foil is provided in a valley part. In addition, the bar-shaped portion is disposed between the top foil and the back foil.

A ninth aspect of the present disclosure is that in the radial foil bearing of any one of the first to eight aspects, the locking recess is formed of a through-hole penetrating the bearing housing from the inner circumferential surface to an outer circumferential surface thereof.

Effects

According to a radial foil bearing of the present disclosure, a locking recess is provided in a central part in the axial direction of an inner circumferential surface of a bearing housing, and a locking protrusion provided in a limiting member is locked into the locking recess. Therefore, it is possible to limit movement of a back foil in the axial direction and to prevent detachment of the back foil without providing a locking recess or a locking groove in a side surface of the bearing housing. Thus, it is possible to prevent deterioration of the durability or deterioration of performance such as the load capability of the bearing due to a partial flexure of a top foil. In addition, it is possible to easily configure a sealing structure at the side surface of the bearing housing.

DESCRIPTION OF EMBODIMENTS

Hereinafter, radial foil bearings of the present disclosure are described in detail with reference to the drawings. In the following drawings, the scale of each member is appropriately changed in order to show each member in a recognizable size.

Figure 1:
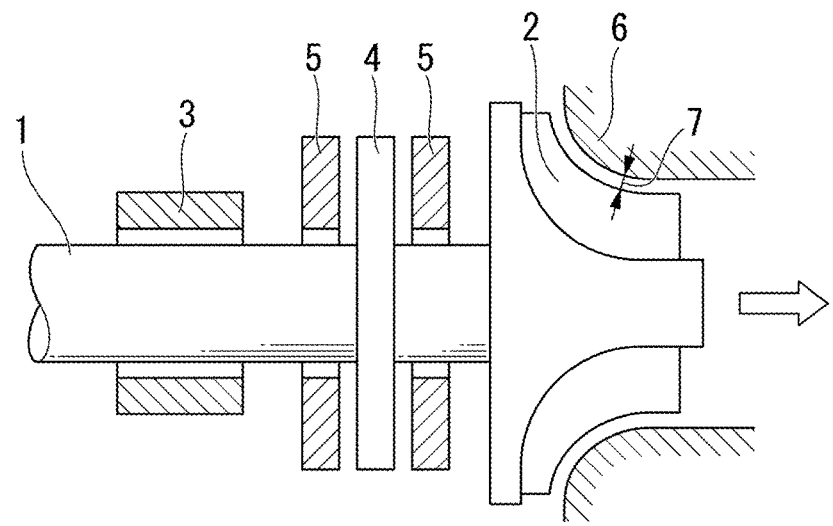
FIG. 1 is a schematic view showing an example of a turbo machine in which a radial foil bearing of the present disclosure is provided.

FIG. 1 is a side view showing an example of a turbo machine in which a radial foil bearing of the present disclosure is provided. In FIG. 1, the reference sign 1 represents a rotary shaft, the reference sign 2 represents an impeller provided in an end part of the rotary shaft, and the reference sign 3 represents the radial foil bearing of the present disclosure. In addition, although only one radial foil bearing is shown in FIG. 1 and another bearing is omitted therefrom, in general, two radial foil bearings are provided in the axial direction of the rotary shaft 1, and thereby a supporting structure for the rotary shaft 1 is configured. Thus, two radial foil bearings 3 are also provided in this embodiment.

A thrust collar 4 is fixed to the rotary shaft 1 in the vicinity of a part of the rotary shaft 1 in which the impeller 2 is formed, and thrust bearings 5 are disposed on two sides of the thrust collar 4 so as to face the thrust collar 4.

The impeller 2 is disposed inside a housing 6 which is a stationary part, and a tip clearance 7 is formed between the impeller 2 and the housing 6.

A radial foil bearing 3 is provided on the rotary shaft 1 so as to encircle the rotary shaft 1 at a position closer to the middle of the rotary shaft 1 than the thrust collar 4.

Figure 2A:
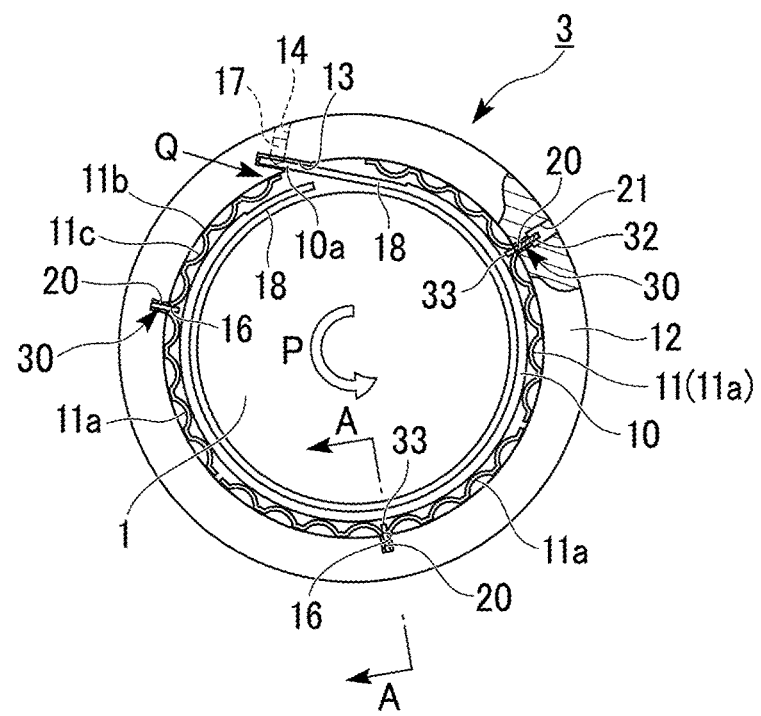
FIG. 2A is a side view showing a schematic configuration of a first embodiment of the radial foil bearing of the present disclosure.
Figure 2B:
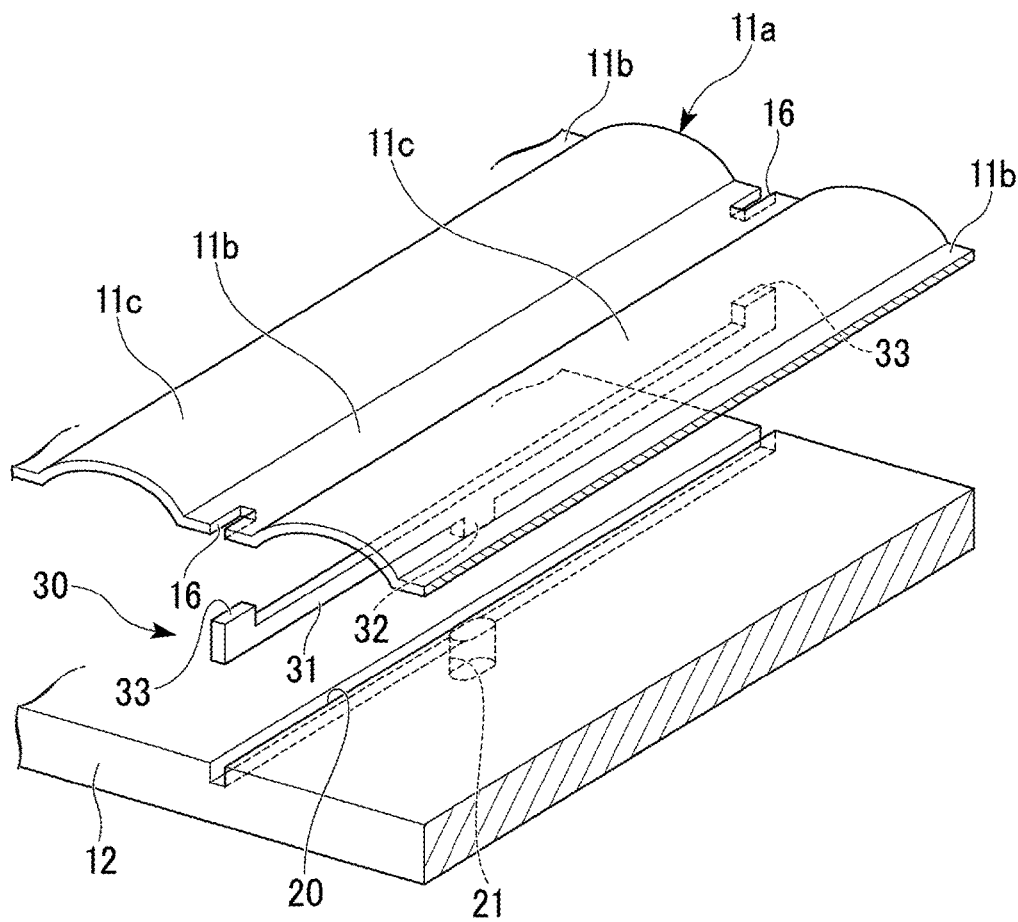
FIG. 2B is an exploded perspective view of a main section of FIG. 2A.
Figure 2C:
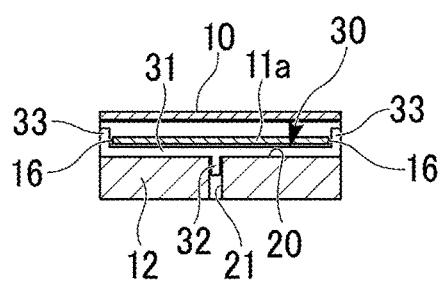
FIG. 2C is a cross-sectional view taken along A-A line in FIG. 2A.

FIGS. 2A to 2C show a first embodiment of the radial foil bearing provided in the turbo machine having the above configuration. FIG. 2A is a side view of the radial foil bearing. FIG. 2B is an exploded perspective view of a main section of FIG. 2A. FIG. 2C is a cross-sectional view taken along A-A line in FIG. 2A. As shown in FIG. 2A, a radial foil bearing 3 of this embodiment is a cylindrical device which supports the rotary shaft 1 in a state of encircling the rotary shaft 1. The radial foil bearing 3 includes a cylindrical top foil 10 disposed so as to face the rotary shaft 1, a back foil 11 disposed outside in the radial direction of the top foil 10, and a bearing housing 12 disposed outside of the back foil 11 in the radial direction.

The bearing housing 12 is a cylindrical metal member configuring the outermost part of the radial foil bearing 3 and accommodates the back foil 11 and the top foil 10. The inner circumferential surface of the bearing housing 12 is provided with a groove 13 which is in the axial direction of the bearing housing 12.

That is, the inner circumferential surface of the bearing housing 12 is provided with the groove 13 on the entire length in the axial direction of the bearing housing 12. The groove 13 is formed so that the depth direction of the groove 13 is the same as the extending direction of one end part 10a (an end part in the circumferential direction) of the top foil 10 described below. In addition, the depth of the groove 13 is about 2 to 5 mm.

The outer circumferential surface of the bearing housing 12 is provided with a pair of holes 14 communicating with the groove 13. The holes 14 are holes into which male screws are inserted, the male screws are used for fixing the one end part 10a of the top foil 10 inserted into the groove 13 as described later to the inside of the groove 13, and the inner circumferential surface of the hole 14 is provided with female threads.

As shown in FIG. 2B, the inner circumferential surface of the bearing housing 12 is provided with a holding groove 20 which is in the axial direction between two end surfaces, namely two side surfaces, of the bearing housing 12. The holding groove 20 is formed so that the width (the width in the circumferential direction of the housing) of the holding groove 20 is sufficiently small such as 1 mm or less, preferably 0.5 mm or less, corresponding to the width (the thickness) of a limiting member 30 described below. The holding groove 20 having such a width can be appropriately formed through, for example, wire-cut electrical discharge machining. In addition, the holding groove 20 is formed so that the depth thereof is sufficiently less than the thickness (the thickness in the radial direction) of the bearing housing 12.

As shown in FIG. 2A, in this embodiment, the holding groove 20 is provided at each of positions of the inner circumferential surface of the bearing housing 12, and the positions divide the inner circumferential surface approximately into three in the circumferential direction. The groove 13 is disposed between two holding grooves 20 among the three holding grooves 20.

As shown in FIGS. 2B and 2C, a locking recess 21 is provided in a central part in the length direction of the holding groove 20 of the bearing housing 12, namely in a central part in the axial direction of the bearing housing 12, and communicates with the holding groove 20. In this embodiment, the locking recess 21 is formed of a through-hole penetrating the bearing housing 12 from the inner circumferential surface to the outer circumferential surface thereof. The opening shape of the locking recess 21 formed of the above through-hole is a circular or oval shape, and the locking recess 21 is formed through hole-making working (machining) using a drill or the like from the outer circumferential surface to the inner circumferential surface of the bearing housing 12.

Since the locking recess 21 is formed through hole-making working using a drill or the like in this way, the inner diameter of the locking recess 21 in the width direction of the holding groove 20 is greater than the width of the holding groove 20. On the other hand, as shown in FIG. 2C, the inner diameter of the locking recess 21 in the length direction of the holding groove 20 is approximately equal to the length (the length in the axial direction of the bearing housing 12) of a locking protrusion 32 described below. Thus, the movement of the limiting member 30 in the axial direction is limited by locking the locking protrusion 32 into the locking recess 21. In addition, the movement of the limiting member 30 in the circumferential direction of the bearing housing 12 is also limited by this locking.

The limiting member 30 is locked into the holding groove 20 communicating with the locking recess 21. As shown in FIGS. 2B and 2C, the limiting member 30 includes a bar-shaped portion 31 formed in a thin plate shape (a square pole shape) accommodated in the holding groove 20, the locking protrusion 32 provided in one surface (a surface facing the bearing housing 12) of the bar-shaped portion 31, and a pair of engagement protrusions 33 provided in another surface (a surface facing the back foil 11) of the bar-shaped portion 31, namely in the opposite surface of the bar-shaped portion 31 from the one surface.

As shown in FIG. 2C, the bar-shaped portion 31 is formed so that the bar-shaped portion 31 engages with and is accommodated in the holding groove 20 and no part of the bar-shaped portion 31 other than the engagement protrusions 33 protrudes outward from the holding groove 20. Specifically, the depth of the holding groove 20 is about 1 to 2 mm, and thus the height (the height in the radial direction of the bearing housing 12) of the bar-shaped portion 31 is also about 1 to 2 mm. The limiting member 30 including the bar-shaped portion 31 is manufactured by, for example, forming a metal foil of stainless steel or the like having a thickness less than 0.5 mm into a predetermined shape, namely into a shape having the locking protrusion 32 and the engagement protrusions 33 through etching.

The locking protrusion 32 is provided and disposed in a position of the bar-shaped portion 31 corresponding to the locking recess 21 of the bearing housing 12, namely in a central part in the axial direction of the bearing housing 12 (a central part in the length direction of the holding groove 20). As described above, the length of the locking protrusion 32 in the length direction of the holding groove 20 is formed to be approximately equal to the inner diameter of the locking recess 21 in the axial direction. Thus, the locking protrusion 32 is locked by inserting the locking protrusion 32 into the locking recess 21 so that the movement of the locking protrusion 32 in the length direction of the holding groove 20 is practically prevented. Therefore, the movement of the limiting member 30 in the axial direction of the bearing housing 12 is limited.

The phrase "a central part in the axial direction of the bearing housing 12" does not only denote the central position in the axial direction of the bearing housing 12 but also denotes any part of the bearing housing 12 other than two side surfaces (two end surfaces) of the bearing housing 12 and the vicinities of the two side surfaces, namely any part being positioned to be closer to the center in the axial direction of the bearing housing 12 than the two side surfaces and the vicinities thereof. Thus, the locking recess 21 may be provided and disposed in a position shifted from the center to one side or the other side of the center in the axial direction without being disposed at the center in the axial direction of the bearing housing 12. In this case, the locking protrusion 32 of the limiting member 30 is also provided and disposed in a position shifted from the center in the length direction of the bar-shaped portion 31 correspondingly to the locking recess 21.

The engagement protrusions 33 are provided in two end parts in the length direction of the bar-shaped portion 31 and protrude from a side of the bar-shaped portion 31 opposite to the locking protrusion 32.

The limiting member 30 having the above configuration is accommodated in the holding groove 20 in a state where the locking protrusion 32 is locked into the locking recess 21 of the bearing housing 12 as described above. At this time, the engagement protrusions 33 protrude from the inner circumferential surface of the bearing housing 12 upward (inward in the radial direction of the bearing housing 12) at two end parts of the holding groove 20.

The back foil 11 is a member which is formed of a foil (a thin sheet) and resiliently supports the top foil 10. As the back foil 11, for example, it is possible to employ a bump foil, a spring foil disclosed in Japanese Unexamined Patent Application, First Publication No. 2006-57652 or in Japanese Unexamined Patent Application, First Publication No. 2004-270904, a back foil disclosed in Japanese Unexamined Patent Application, First Publication No. 2009-299748, or the like. In this embodiment, a bump foil is employed as the back foil 11. However, the above spring or back foil may be employed as the back foil of the present disclosure.

As shown in FIG. 2A, in this embodiment, the back foil 11 (a bump foil) includes three (a plurality of) back foil pieces 11a arranged in the circumferential direction of the top foil 10. Each back foil piece 11a is a member in which a foil (a thin sheet) is formed in a wave sheet shape and whose entire side shape is formed in an approximate arc shape, and the three back foil pieces 11a are formed having the same shape and size. Thus, the back foil pieces 11a are disposed in positions which divide the inner circumferential surface of the bearing housing 12 approximately into three.

The back foil pieces 11a at positions between which the groove 13 is interposed are disposed with a comparatively large gap, and at the other positions, the ends of the back foil pieces 11a are disposed to be close to each other. According to this configuration, the three back foil pieces 11a as a whole are formed in an approximately cylindrical shape and are arranged along the inner circumferential surface of the bearing housing 12.

Figure 3A:
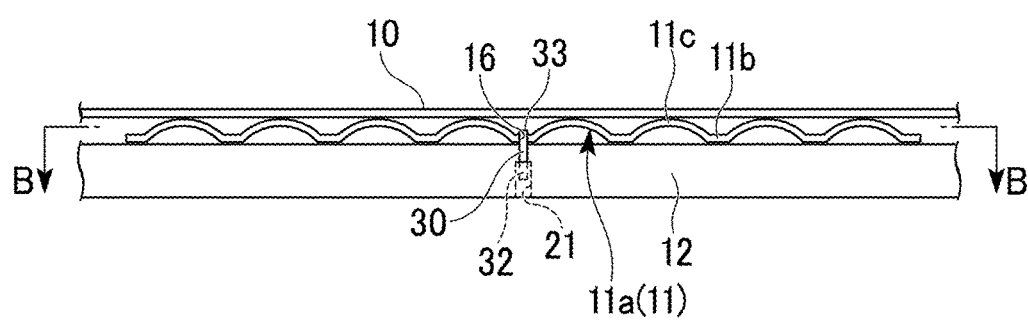
FIG. 3A is a side view schematically showing a flattened main section of FIG. 2A.

As shown in FIG. 3A schematically showing a flattened main section of FIG. 2A, in the back foil piece 11a formed in a wave sheet shape in this way, flat valley parts 11b contacting the bearing housing 12 and curved peak parts 11c bulging toward and contacting the top foil 10 are alternately formed (arranged) in the circumferential direction of the bearing housing 12. Accordingly, the back foil piece 11a resiliently supports the top foil 10 particularly through the peak parts 11c contacting the top foil 10.

In addition, the back foil piece 11a forms fluid flow passageways of the peak parts 11c and the valley parts 11b in the axial direction of the radial foil bearing 3.

Figure 3B:
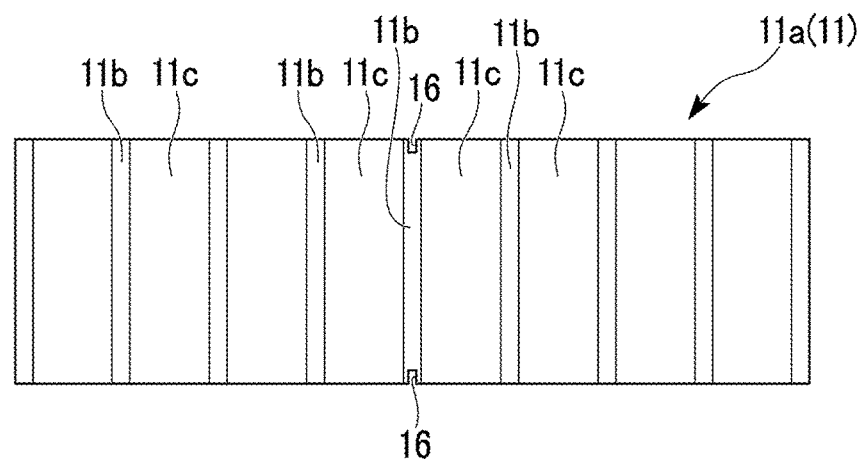
FIG. 3B is a view taken along B-B line in FIG. 3A.

As shown in FIG. 3B which is a view taken along B-B line in FIG. 3A, engagement notches 16 are provided in circumferential edge parts on two sides (edge parts of two ends in the axial direction of the bearing housing 12) of the circumferential direction center (the center in the circumferential direction of the bearing housing 12) of each back foil piece 11a. As shown in FIG. 2B, the engagement notches 16 are provided in a valley part 11b of the back foil piece 11a, and the engagement notch 16 is formed by cutting out from the valley part 11b configured of a flat part formed between the peak parts 11c, a long and thin rectangular part extending from the side circumferential edge (the end in the axial direction) toward the inside (the center in the axial direction) of the valley part 11b.

The engagement notch 16 is formed at a position of the back foil piece 11a corresponding to the engagement protrusion 33 of the limiting member 30, namely at the position overlapping the engagement protrusion 33, and the longitudinal and lateral widths of the engagement notch 16 are formed to be approximately the same as the longitudinal and lateral widths of the engagement protrusion 33 in order that the engagement notch 16 engages with the engagement protrusion 33. Specifically, the lateral width of the engagement notch 16 in the circumferential direction of the bearing housing 12 is about 0.2 to 0.5 mm, and the longitudinal width thereof in the axial direction is about 1 to 2 mm.

It is preferable that the engagement notch 16 be formed by performing etching or electrical discharge machining on a foil in order to prevent burring due to working or distortion due to stress. That is, it is preferable that a foil be formed with the engagement notches 16 through etching or electrical discharge machining, and thereafter press molding be performed on the foil in order to form the peak parts 11c and the valley parts 11b, whereby the back foil piece 11a be manufactured.

Under this configuration, as shown in FIG. 2C, the engagement notches 16 of the back foil piece 11a engage with the engagement protrusions 33 of the limiting member 30.

As shown in FIG. 2A, the top foil 10 is a member wound into a cylindrical shape along the inner surface of the back foil 11 including the three back foil pieces 11a, and is arranged so that the end of the one end part 10a thereof engages with the groove 13 provided in the bearing housing 12.

The top foil 10 is formed by winding a rectangular metal foil, whose long side is in the bearing circumferential direction and whose short side is in the bearing length direction (the axial direction), in the length direction (the bearing circumferential direction) of the long side into a cylindrical shape.

It is to be noted that the top foil 10 is not wound so that two ends (two ends in the circumferential direction) of the above metal foil butt against each other but is wound so that the one end part 10a overlaps the outside in the radial direction of the other end part of the metal foil. In addition, the one end part 10a is formed extending in a direction parallel to the tangential line at a position of the cylindrical portion formed of part of the metal foil other than the one end part 10a.

The groove 13 of the bearing housing 12 is formed so that the depth direction thereof is the same as the extending direction of the one end part 10a of the top foil 10.

Thus, the top foil 10 is disposed so that the extending direction of the one end part 10a is the same as the depth direction of the groove 13, and the end of the one end part 10a is engaged with the groove 13. Accordingly, the top foil 10 is not deformed in a state where the one end part 10a engages with the groove 13, and thus occurrence of distortion of the top foil 10 is prevented.

In this embodiment, the one end part 10a of the top foil 10 engaging with the groove 13 is fixed to the inside of the groove 13 using male screws 17. That is, the male screws 17 are screwed and inserted into the holes 14, and thereby the one end part 10a is brought into close contact with an inner wall surface of the groove 13 and is fixed thereto. In addition, the deformation of the one end part 10a is slight which is caused by the close contact of the one end part 10a with the inner wall surface of the groove 13 in this way, and thus occurrence of distortion of the top foil 10 due to the deformation is practically prevented.

The one end part 10a and the other end part opposite thereto of the top foil 10 are provided with thin parts 18 thinner than a central part of the top foil 10 positioned between the one end part 10a and the other end part. The thin parts 18 are formed by being thinned so as to be in a state where the outer circumferential surfaces (the surfaces facing the back foil 11) of the thin parts 18 are depressed from the outer circumferential surface of the above central part.

When the thin parts 18 are formed, two end parts of the top foil 10 are formed having a designed thickness (thinness) through, for example, etching while the thickness thereof is controlled in the order of ten micrometers. Specifically, in a case where the bearing diameter φ is 35 mm, if the thickness of the top foil 10 is 100 μm, the thickness of the thin part 18 is set to about 80 μm. In addition, a stress occurring in the top foil 10 during such etching is significantly less than that in bending machining or the like, and thus occurrence of distortion of the top foil 10 is practically prevented.

The length of the thin part 18 in the circumferential direction is set to the length obtained by, for example, adding the length of the groove 13 in the circumferential direction and the length in the circumferential direction of one peak part of the end part of the back foil 11 positioned on one of two sides of the groove 13.

Since the thin parts 18 are provided in two end parts of the top foil 10 in this way, the two end parts (the thin parts 18) easily resiliently deform and thus become curved surfaces along curved surfaces forming the inner circumferential surface of the bearing housing 12. Accordingly, occurrence of a force (a local preload) clamping the rotary shaft 1 is practically prevented at the two end parts of the top foil 10.

That is, in a case where one end part (a weld toe) of a top foil is fixed to a bearing housing through spot-welding, portions close to two ends (portions close to the weld toe and a free end) of the top foil do not easily bend along curved surfaces forming the inner circumferential surface of the bearing housing, and become close to be flat. Accordingly, a force (a local preload) clamping a rotary shaft occurs at the portions close to be flat, and as a result, the starting torque may increase, and the amount of heat generated during operation may exceed the set value. In contrast, since the thin parts 18 are provided in two end parts of the top foil 10 of this embodiment, as described above, occurrence of a force (a local preload) clamping the rotary shaft 1 is practically prevented.

Since the two end parts of the top foil 10 are thinned so that the outer circumferential surfaces of the two end parts are depressed from the outer circumferential surface of the above central part and thus the thin parts 18 are formed, a gap is formed between the thin part 18 and one peak part of an end part of the back foil 11 supporting the outer circumferential surface of the top foil 10. Accordingly, occurrence of a force (a local preload) clamping the rotary shaft 1 is reliably prevented at the thin parts 18.

Next, the operation of the radial foil bearing 3 having the above configuration is described.

In a state where the rotary shaft 1 stops, the top foil 10 is pushed by the back foil 11 (the three back foil pieces 11a) toward the rotary shaft 1 and thus is in close contact with the rotary shaft 1.

In this embodiment, since two end parts of the top foil 10 are provided with the thin parts 18, occurrence of a force (a local preload) clamping the rotary shaft 1 is practically prevented at the thin parts 18.

When the rotary shaft 1 is started rotating in the arrow P direction in FIG. 2A, at first, the rotary shaft 1 starts rotating at a low speed, and thereafter gradually accelerates and rotates at a high speed. Then, as shown by the arrow mark Q in FIG. 2A, an ambient fluid is led and flows through a gap between the one end part 10a of the top foil 10 and one end of the back foil piece 11a into a space between the top foil 10 and the rotary shaft 1. Therefore, a fluid lubrication film is formed between the top foil 10 and the rotary shaft 1.

The film pressure of the fluid lubrication film acts on the top foil 10 and presses each peak part 11c of the back foil piece 11a contacting the top foil 10. Thus, the back foil piece 11a is pressed by the top foil 10, whereby the peak parts 11c thereof are pressed and expand, and accordingly the back foil piece 11a starts moving in the circumferential direction on the inner circumferential surface of the bearing housing 12.

That is, since the back foil piece 11a (the back foil 11) resiliently supports the top foil 10, the back foil piece 11a deforms in the circumferential direction when receiving a load from the top foil 10, and thereby allows a flexure of the top foil 10 and supports the top foil 10.

However, as shown in FIG. 2C, the engagement protrusions 33 of the limiting member 30 engage with the engagement notches 16 provided in side circumferential edge parts of the back foil piece 11a, and the movement of the limiting member 30 is limited in the axial direction and the circumferential direction of the bearing housing 12 because the bar-shaped portion 31 is accommodated in the holding groove 20 and the locking protrusion 32 is locked into the locking recess 21. Accordingly, the back foil piece 11a is prevented from rotating in the circumferential direction on the inner circumferential surface of the bearing housing 12. Thus, although each peak part 11c of the back foil piece 11a deforms (moves) in the circumferential direction in a state where the engagement notch 16 engaged with the engagement protrusion 33 is a fixed point (a fixed end), the center of the back foil piece 11a is prevented from being shifted from a predetermined position.

When the back foil piece 11a deforms (moves) in the circumferential direction, since the deformation of the back foil piece 11a is affected by friction between the back foil piece 11a and the bearing housing 12 or between the back foil piece 11a and the top foil 10, two end parts, namely portions close to the free ends, of the back foil piece 11a easily deform (easily move), whereas a portion close to the fixed point (the fixed end) does not easily deform.

Therefore, a difference in the supporting rigidity of the back foil piece 11a may occur between a position close to the free end and another position close to the fixed end.

However, in this embodiment, the engagement notches 16 are provided in a central part of the back foil piece 11a in the circumferential direction, and thus the fixed point using the engagement protrusions 33 is a central part of the back foil piece 11a in the circumferential direction. Therefore, the distance between the fixed end and the free end is decreased. Thus, the difference in the supporting rigidity becomes small. Furthermore, in this embodiment, since the back foil 11 is divided into the three back foil pieces 11a, the distance between the fixed end and the free end is less than that in a case where the back foil 11 is formed of only one foil, and thus the difference in the supporting rigidity between a position close to the free end and another position close to the fixed end becomes smaller yet.

Since the movement of the back foil piece 11a in the axial direction is also limited by the engagement protrusions 33 of the limiting member 30 during high-speed rotation of the rotary shaft 1, even when an unexpected impact or the like is added to the bearing, the back foil piece 11a is prevented from detaching from the bearing housing 12.

In a transient state before a fluid lubrication film is formed, solid friction occurs between the rotary shaft 1 and the top foil 10 and becomes the resistance at the time of start-up. However, as described above, a preload does not occur at two end parts of the top foil 10, a part of the top foil 10 close to a position into which an ambient fluid flows is the thin part 18 and is flexible, and thus the top foil 10 easily separates from the rotary shaft 1. Therefore, a fluid lubrication film is formed in a short time after the rotary shaft 1 starts rotating, and the rotary shaft 1 rotates in a non-contact state with respect to the top foil 10.

In the radial foil bearing 3, the locking recess 21 is provided in a central part in the axial direction of the inner circumferential surface of the bearing housing 12, and the locking protrusion 32 provided in a central part in the length direction of the limiting member 30 is locked into the locking recess 21. Therefore, the movement of the back foil 11 (the back foil piece 11a) in the axial direction can be limited and the detachment of the back foil 11 can be prevented without providing a conventional locking recess or groove in a side surface of the bearing housing 12. Thus, it is possible to prevent deterioration of the durability of the bearing or deterioration of performance such as the load capability thereof due to a partial flexure of the top foil 10. In addition, since no conventional locking recess or groove is provided in a side surface of the bearing housing 12, a sealing structure can be easily configured at the side surface of the bearing housing 12.

The locking recess 21 is formed of a through-hole penetrating the bearing housing 12 from the inner circumferential surface to the outer circumferential surface thereof. Accordingly, the locking recess 21 can also function as a ventilation hole through which cooling air is led into a central portion of the bearing housing 12, and thus it is possible to efficiently cool the central portion which has a lower air permeability and a higher heat retention than those of two end parts in the axial direction of the bearing housing 12, and to prevent overheating of the bearing.

Since the engagement protrusions 33 provided in the bar-shaped portion 31 of the limiting member 30 are engaged with the engagement notches 16 provided in the back foil piece 11a, the movement of the back foil piece 11a in the axial direction can be reliably prevented by the limiting member 30.

Since the engagement protrusions 33 are provided in two end parts of the bar-shaped portion 31 and the engagement notches 16 are provided in circumferential edge parts on two sides of the back foil piece 11a, the engagement protrusions 33 of the limiting member 30 can hold two sides (two sides in the axial direction) of the back foil piece 11a from the outsides thereof, and thus the movement of the back foil piece 11a in the axial direction is further reliably prevented by the limiting member 30 holding the back foil piece 11a.

A bump foil (bump foil pieces) in which the valley parts 11b and the peak parts 11c are alternately formed is employed as the back foil 11 (the back foil pieces 11a). Since the back foil 11 contacts the top foil 10 through the peak parts 11c, the limiting member 30 can be disposed in a state where the engagement protrusions 33 of the limiting member 30 engaging with the engagement notches 16 provided in the valley part 11b do not contact the top foil 10.

The protrusion height of the engagement protrusion 33 from the bar-shaped portion 31 may be greater than the foil thickness of the back foil piece 11a in order to maintain stable engagement between the engagement protrusion 33 and the engagement notch 16. In this case, it is sufficient that the protrusion height of the engagement protrusion 33 from the bar-shaped portion 31 is set to be less than or equal to the height of the peak part 11c deformed by a load being added thereto in order to prevent the engagement protrusion 33 from contacting the top foil 10.

Figure 4A:
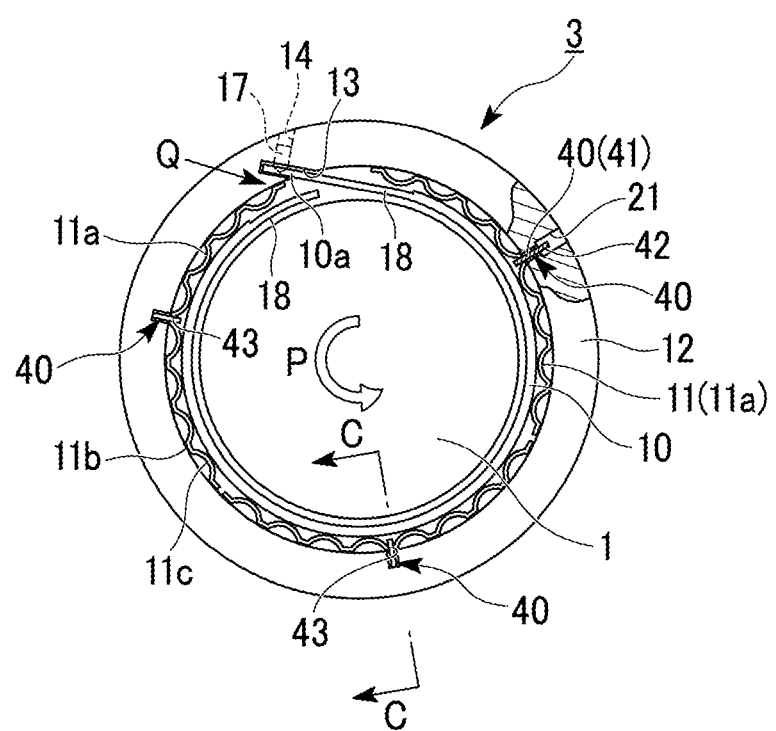
FIG. 4A is a side view showing a schematic configuration of a second embodiment of the radial foil bearing of the present disclosure.
Figure 4B:
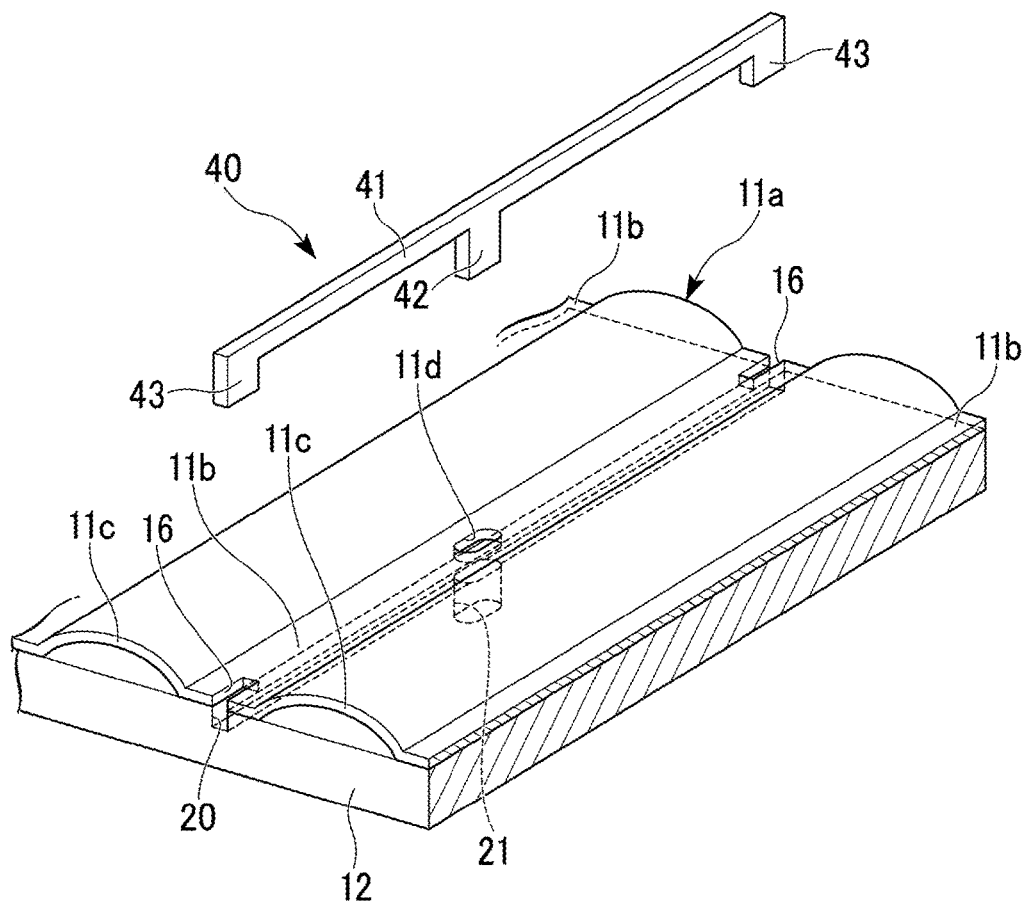
FIG. 4B is an exploded perspective view of a main section of FIG. 4A.
Figure 4C:
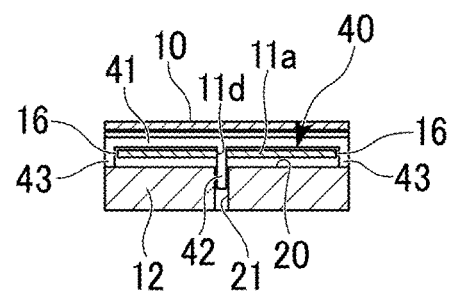
FIG. 4C is a cross-sectional view taken along C-C line in FIG. 4A.
Figure 5A:
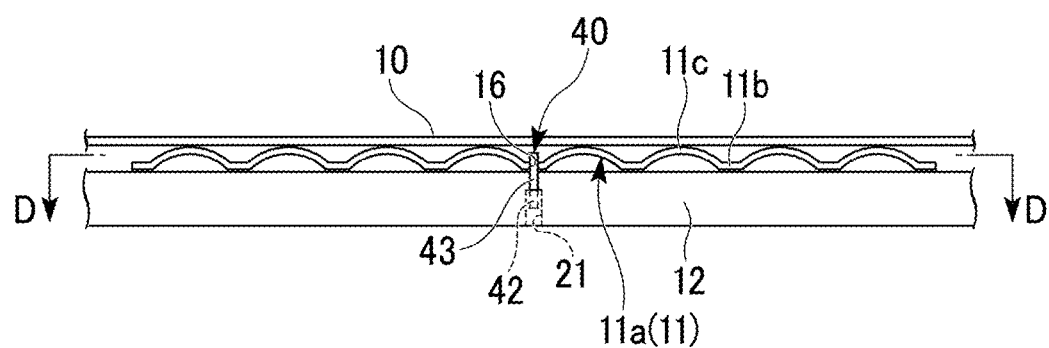
FIG. 5A is a side view schematically showing a flattened main section of FIG. 4A.
Figure 5B:
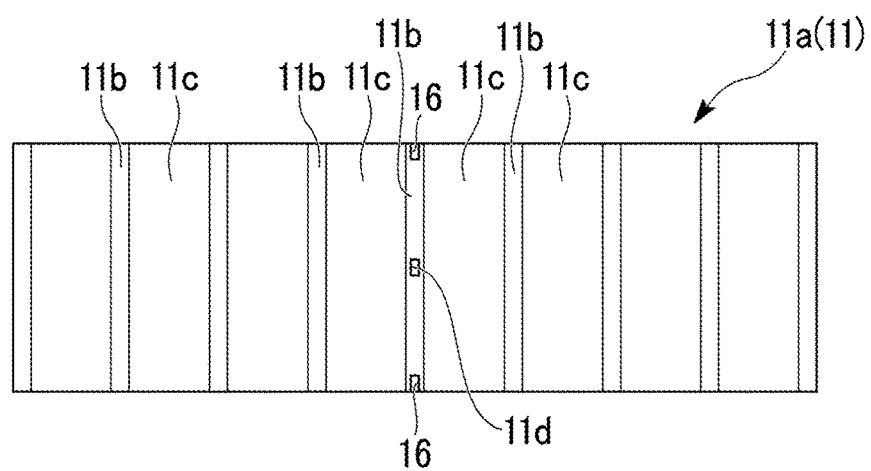
FIG. 5B is a view taken along D-D line in FIG. 5A.

Next, a second embodiment of the radial foil bearing provided in the turbo machine shown in FIG. 1 is described with reference to FIGS. 4A to 4C, 5A and 5B. FIG. 4A is a side view of the radial foil bearing. FIG. 4B is an exploded perspective view of a main section of FIG. 4A. FIG. 4C is a cross-sectional view taken along C-C line in FIG. 4A. FIG. 5A is a side view schematically showing a flattened main section of FIG. 4A. FIG. 5B is a view taken along D-D line in FIG. 5A.

The radial foil bearing 3 of this embodiment differs from the radial foil bearing 3 of the first embodiment shown in FIGS. 2A to 2C, 3A and 3B in the structure and arrangement of a limiting member and the structure of a back foil.

That is, as shown in FIGS. 4A to 4C, in the radial foil bearing 3 of this embodiment, a bar-shaped portion 41 of a limiting member 40 is disposed between a back foil 11 and a top foil 10. In addition, as shown in FIG. 5B, in the back foil 11, a locking hole 11d is provided in a middle part in the length direction of a valley part 11b in which engagement notches 16 are provided.

A bearing housing 12 is formed having the same shape as that in the first embodiment, and the inner circumferential surface of the bearing housing 12 is provided with a groove 13 and three holding grooves 20. In addition, as shown in FIGS. 4B and 4C, in the bearing housing 12, a locking recess 21 formed of a through-hole is provided in a central part in the length direction of each of the three holding grooves 20 so as to communicate with each holding groove 20. The holding grooves 20, the locking recesses 21 and the groove 13 are formed similarly to those of the first embodiment. In addition, in this embodiment, the term "central part" in the axial direction of the bearing housing 12 or in the length direction of the holding groove 20 is used for showing the same meaning as that in the first embodiment, and the term does not only denote the central position in the axial or length direction thereof but also denotes a portion thereof other than two side surfaces (two end surfaces) of the bearing housing 12 and the vicinities of the two side surfaces, namely the portion being positioned to be closer to the central position than the two side surfaces and the vicinities thereof.

As shown in FIGS. 4B and 4C, the limiting member 40 includes the bar-shaped portion 41 having a thin plate shape (a square pole shape), and a locking protrusion 42 and a pair of engagement protrusions 43 provided in one surface (a surface facing the back foil 11) of the bar-shaped portion 41. As described above, the limiting member 40 is disposed between the back foil 11 and the top foil 10. Thus, the limiting member 40 is disposed on a valley part 11b of a bump foil (the back foil 11) in a state where the bar-shaped portion 41 is not accommodated in the holding groove 20 provided in the bearing housing 12. That is, the valley part 11b of the back foil 11 is disposed between the bar-shaped portion 41 and the bearing housing 12 in the radial direction.

Thus, the locking protrusion 42 is formed extending longer outward (outward in the radial direction) of the bar-shaped portion 41 than the locking protrusion 32 of the limiting member 30 of the first embodiment. In addition, although the engagement protrusions 43 are provided in two end parts in the length direction of the bar-shaped portion 41 similarly to the engagement protrusions 33 of the first embodiment, the engagement protrusions 43 are formed protruding from the same side as a side of the bar-shaped portion 41 in which the locking protrusion 42 is positioned unlike the first embodiment. In this embodiment, the engagement protrusions 43 are formed having a greater length than the thickness of the back foil 11 and are formed extending shorter than the locking protrusion 42.

As shown in FIGS. 5A and 5B, the back foil 11 is configured of three back foil pieces 11a and each back foil piece 11a includes valley parts 11b and peak parts 11c similarly to the first embodiment.

As shown in FIG. 5B, the engagement notches 16 are provided in circumferential edge parts on two sides (edge parts of two ends in the axial direction of the bearing housing 12) of the circumferential direction center (the center in the circumferential direction of the bearing housing 12) of each back foil piece 11a. The engagement notches 16 are provided in the valley part 11b of the back foil piece 11a, and the engagement notch 16 is formed by cutting out from the valley part 11b configured of a flat part formed between the peak parts 11c, a long and thin rectangular part extending from the side circumferential edge (the end in the axial direction) toward the inside (the center in the axial direction) of the valley part 11b.

In this embodiment, as shown in FIGS. 4B and 5B, the locking hole 11d is provided in a middle part in the length direction (the axial direction) of the valley part 11b of the back foil piece 11a in which the engagement notches 16 are provided. The locking hole 11d is an opening provided in the back foil piece 11a at a position corresponding to the locking recess 21 provided in the bearing housing 12. That is, the locking hole 11d is provided and disposed in the back foil piece 11a so as to communicate with the locking recess 21 when the back foil piece 11a is disposed at a predetermined position inside the bearing housing 12.

The structure of the top foil 10 and the structure for attaching the top foil 10 to the bearing housing 12 are the same as those of the first embodiment, and therefore the descriptions thereof are omitted.

As shown in FIGS. 4B and 4C, in the limiting member 40 having the above configuration, the bar-shaped portion 41 is disposed on a valley part 11b determined in advance of the back foil piece 11a between the top foil 10 and the back foil 11 (the back foil piece 11a).

The locking protrusion 42 is inserted into the locking recess 21 through the locking hole 11d of the back foil piece 11a and is locked into the locking recess 21. In addition, the engagement protrusions 43 are engaged with the engagement notches 16 of the back foil piece 11a, and in this state, the ends of the engagement protrusions 43 are inserted into the holding groove 20.

The radial foil bearing 3 having the above configuration can operate similarly to the first embodiment.

That is, since the engagement protrusions 43 also limit the movement of the back foil piece 11a in the axial direction during high-speed rotation of the rotary shaft 1, even when an unexpected impact or the like is added to the bearing, the back foil piece 11a is prevented from detaching from the bearing housing 12.

In the radial foil bearing 3 of this embodiment, the locking recess 21 is provided in a central part in the axial direction of the inner circumferential surface of the bearing housing 12, and the locking protrusion 42 provided in a central part in the length direction of the limiting member 40 is locked into the locking recess 21. Therefore, the movement of the back foil 11 (the back foil piece 11a) in the axial direction can be limited and the detachment of the back foil 11 can be prevented without providing a conventional locking recess or groove in a side surface of the bearing housing 12. Thus, it is possible to prevent deterioration of the durability of the bearing or deterioration of performance such as the load capability thereof due to a partial flexure of the top foil 10. In addition, a sealing structure can be easily configured at the side surface of the bearing housing 12.

Since the locking recess 21 is formed of a through-hole penetrating the bearing housing 12 from the inner circumferential surface to the outer circumferential surface thereof, the locking recess 21 can also function as a ventilation hole through which cooling air is led into a central portion of the bearing housing 12. Thus, it is possible to efficiently cool the central portion which has a lower air permeability and a higher heat retention than those of two end parts in the axial direction of the bearing housing 12, and to prevent overheating of the bearing.

The locking protrusion 42 provided in the bar-shaped portion 41 of the limiting member 40 is locked into the locking recess 21 of the bearing housing 12 through the locking hole 11d of the back foil piece 11a, and the engagement protrusions 43 are engaged with the engagement notches 16 provided in the back foil piece 11a. Therefore, the movement of the back foil piece 11a in the axial direction can be reliably prevented by the limiting member 40.

The engagement protrusions 43 are provided in two end parts of the bar-shaped portion 41, and the engagement notches 16 are provided in circumferential edge parts on two sides of the back foil piece 11a. Therefore, the engagement protrusions 43 of the limiting member 40 can hold two sides of the back foil piece 11a from the outsides thereof. Thus, the movement of the back foil piece 11a in the axial direction can be further reliably prevented by the limiting member 40 holding the back foil piece 11a.

Since the engagement protrusions 43 are engaged with the engagement notches 16 of the back foil piece 11a and are inserted into the holding groove 20, the engagement protrusions 43 can sufficiently and stably engage with the engagement notches 16 of the back foil piece 11a, and thus the back foil piece 11a can be reliably held by the limiting member 40.

A bump foil (bump foil pieces) in which valley parts 11b and peak parts 11c are alternately formed is employed as the back foil 11 (the back foil pieces 11a), and the bar-shaped portion 41 is disposed between the top foil 10 and the back foil 11. Therefore, the limiting member 40 engaging with the engagement notches 16 provided in a valley part 11b can be prevented from contacting the top foil 10 by the bar-shaped portion 41 being disposed on the valley part 11b.

Hereinbefore, although embodiments of the present disclosure are described with reference to the attached drawings, the present disclosure is not limited to the above embodiments. The shape, the combination or the like of each component shown in the above embodiments is an example, and additions, omissions, replacements, and other modifications of a configuration based on a design request or the like can be adopted within the scope of the present disclosure.

For example, in the above embodiments, the back foil 11 is configured of the three back foil pieces 11a. However, the back foil 11 may be configured of only one foil in which one metal foil is formed in an approximately cylindrical shape. In addition, in a case where the back foil 11 is configured of a plurality of back foil pieces 11a, the back foil 11 may be configured of two, four or more back foil pieces 11a.

In the above embodiments, the engagement notches 16 are provided in a central part of the back foil piece 11a in the circumferential direction and are engaged with the engagement protrusions 33(43), whereby a portion in which the engagement notch 16 is provided is set to a fixed end (a fixed point). However, the engagement notch 16 may be provided in an end part of the back foil piece 11a in the circumferential direction. In addition, even when the back foil 11 is configured of only one foil, the engagement notch 16 may be provided in an end part of the back foil 11 in the circumferential direction.

Although only one locking protrusion 32(42) and only one locking recess 21 are provided in the above embodiments, a plurality of locking protrusions and a plurality of locking recesses may be provided, and a locking protrusion may be locked into a locking recess corresponding to the locking protrusion. That is, a plurality of locking recesses and a plurality of locking protrusions may be employed in order to limit the movement of one back foil piece 11a (or the back foil 11 configured of only one foil) in the axial direction. In this case, the plurality of locking recesses may be disposed in a straight line extending in the axial direction on the inner circumferential surface of the bearing housing 12.

Although the locking recess 21 is formed of a through-hole penetrating the bearing housing 12 in the above embodiments, the locking recess 21 may be formed merely of a hole (a non-through hole) formed so as to be depressed from the inner circumferential surface of the bearing housing 12.

In the above embodiments, one end part 10a of the top foil 10 is engaged with the groove 13 provided in the bearing housing 12, and thereby the top foil 10 is accommodated in and fixed to the inside of the bearing housing 12 without fixing the top foil 10 thereto through welding. However, the fixing of the top foil 10 can be performed through any means including welding.

The limiting member 30(40) of the above embodiments includes the bar-shaped portion 31(41), and the limiting member 30(40) as a whole is formed in a bar shape. However, a limiting member of the present disclosure may be formed in, for example, a strip shape (a long and thin plate shape extending in the axial direction of a bearing housing), and a plate surface of the limiting member may be disposed to be parallel to the inner circumferential surface of the bearing housing.

INDUSTRIAL APPLICABILITY

The present disclosure can be used for a radial foil bearing which supports a rotary shaft in a state of encircling the rotary shaft.

The invention claimed is:

1. A radial foil bearing for supporting a rotary shaft in a state of encircling the rotary shaft, the radial foil bearing comprising:
   a cylindrical top foil disposed so as to face the rotary shaft;
   a back foil disposed outside in a radial direction of the top foil; and
   a cylindrical bearing housing accommodating the top foil and the back foil;
   wherein the bearing housing is provided with a limiting member which limits movement of the back foil at least in an axial direction of the bearing housing,
   wherein a locking recess is provided in a central part in the axial direction of an inner circumferential surface of the bearing housing, and
   wherein the limiting member includes a locking protrusion and is fixed to the bearing housing by the locking protrusion being locked into the locking recess of the bearing housing.

2. The radial foil bearing according to claim 1,
   wherein the inner circumferential surface of the bearing housing is provided with a holding groove which is formed in the axial direction and communicates with the locking recess,
   wherein the limiting member includes a bar-shaped portion and an engagement protrusion provided in the bar-shaped portion,
   wherein a central part in a length direction of the bar-shaped portion is provided with the locking protrusion, and the bar-shaped portion is accommodated in and fixed to the holding groove in a state where the locking protrusion is locked into the locking recess,
   wherein the engagement protrusion protrudes upward of the holding groove, and
   wherein the back foil is provided with an engagement notch which engages with the engagement protrusion.

3. The radial foil bearing according to claim 2,
   wherein the engagement protrusion is provided in each of two end parts in the length direction of the bar-shaped portion, and
   wherein the engagement notch is provided in each of two edge parts in the axial direction of the back foil.

4. The radial foil bearing according to claim 3,
   wherein the back foil is formed in a wave sheet shape in which valley parts contacting the bearing housing and peak parts bulging toward the top foil are alternately arranged in a circumferential direction of the bearing housing, and
   wherein the engagement notch of the back foil is provided in a valley part.

5. The radial foil bearing according to claim 4,
wherein the locking recess is formed of a through-hole penetrating the bearing housing from the inner circumferential surface to an outer circumferential surface thereof.

6. The radial foil bearing according to claim 3,
wherein the locking recess is formed of a through-hole penetrating the bearing housing from the inner circumferential surface to an outer circumferential surface thereof.

7. The radial foil bearing according to claim 2,
wherein the back foil is formed in a wave sheet shape in which valley parts contacting the bearing housing and peak parts bulging toward the top foil are alternately arranged in a circumferential direction of the bearing housing, and
wherein the engagement notch of the back foil is provided in a valley part.

8. The radial foil bearing according to claim 7,
wherein the locking recess is formed of a through-hole penetrating the bearing housing from the inner circumferential surface to an outer circumferential surface thereof.

9. The radial foil bearing according to claim 2,
wherein the locking recess is formed of a through-hole penetrating the bearing housing from the inner circumferential surface to an outer circumferential surface thereof.

10. The radial foil bearing according to claim 1,
wherein the inner circumferential surface of the bearing housing is provided with a holding groove which is formed in the axial direction and communicates with the locking recess,
wherein the back foil is provided with a locking hole and an engagement notch,
wherein the limiting member includes a bar-shaped portion and an engagement protrusion which is provided in the bar-shaped portion and engages with the engagement notch of the back foil, and
wherein a central part in a length direction of the bar-shaped portion is provided with the locking protrusion, and the bar-shaped portion is disposed above the holding groove in a state where the back foil is positioned between the bar-shaped portion and the bearing housing and the locking protrusion is locked into the locking recess through the locking hole.

11. The radial foil bearing according to claim 10,
wherein the engagement protrusion is provided in each of two end parts in the length direction of the bar-shaped portion, and
wherein the engagement notch is provided in each of two edge parts in the axial direction of the back foil.

12. The radial foil bearing according to claim 11,
wherein the engagement protrusion engages with the engagement notch of the back foil and is inserted into the holding groove.

13. The radial foil bearing according to claim 12,
wherein the back foil is formed in a wave sheet shape in which valley parts contacting the bearing housing and peak parts bulging toward the top foil are alternately arranged in a circumferential direction of the bearing housing,
wherein the engagement notch of the back foil is provided in a valley part, and
wherein the bar-shaped portion is disposed between the top foil and the back foil.

14. The radial foil bearing according to claim 13,
wherein the locking recess is formed of a through-hole penetrating the bearing housing from the inner circumferential surface to an outer circumferential surface thereof.

15. The radial foil bearing according to claim 12,
wherein the locking recess is formed of a through-hole penetrating the bearing housing from the inner circumferential surface to an outer circumferential surface thereof.

16. The radial foil bearing according to claim 11,
wherein the back foil is formed in a wave sheet shape in which valley parts contacting the bearing housing and peak parts bulging toward the top foil are alternately arranged in a circumferential direction of the bearing housing,
wherein the engagement notch of the back foil is provided in a valley part, and
wherein the bar-shaped portion is disposed between the top foil and the back foil.

17. The radial foil bearing according to claim 16,
wherein the locking recess is formed of a through-hole penetrating the bearing housing from the inner circumferential surface to an outer circumferential surface thereof.

18. The radial foil bearing according to claim 11,
wherein the locking recess is formed of a through-hole penetrating the bearing housing from the inner circumferential surface to an outer circumferential surface thereof.

19. The radial foil bearing according to claim 10,
wherein the locking recess is formed of a through-hole penetrating the bearing housing from the inner circumferential surface to an outer circumferential surface thereof.

20. The radial foil bearing according to claim 1,
wherein the locking recess is formed of a through-hole penetrating the bearing housing from the inner circumferential surface to an outer circumferential surface thereof.

* * * * *